(12) United States Patent
Wang et al.

(10) Patent No.: US 7,272,261 B2
(45) Date of Patent: Sep. 18, 2007

(54) METHOD AND SYSTEM FOR CLASSIFYING SCANNED-MEDIA

(75) Inventors: Shen-Ge Wang, Fairport, NY (US);
Reiner Eschbach, Webster, NY (US);
Gaurav Sharma, Webster, NY (US)

(73) Assignee: Xerox Corporation, Stamford, CT (US)

( * ) Notice: Subject to any disclaimer, the term of this patent is extended or adjusted under 35 U.S.C. 154(b) by 704 days.

(21) Appl. No.: 10/861,855

(22) Filed: Jun. 4, 2004

(65) Prior Publication Data

US 2005/0271265 A1 Dec. 8, 2005

(51) Int. Cl.
*G06K 9/62* (2006.01)
(52) U.S. Cl. ......................... 382/224; 382/250
(58) Field of Classification Search ......... 358/1.1–305;
375/240.2; 382/224, 250; 708/402
See application file for complete search history.

(56) References Cited

U.S. PATENT DOCUMENTS

| | | | | |
|---|---|---|---|---|
| 5,341,226 A | 8/1994 | Shiau | | 358/518 |
| 5,416,613 A | 5/1995 | Rolleston et al. | | 358/518 |
| 5,687,303 A | 11/1997 | Motamed et al. | | 395/117 |
| 5,760,913 A | 6/1998 | Falk | | 358/298 |
| 5,765,029 A | 6/1998 | Schweid et al. | | 395/61 |
| 5,778,092 A | 7/1998 | MacLeod et al. | | 382/176 |
| 5,850,474 A | 12/1998 | Fan et al. | | 382/173 |
| 5,883,979 A * | 3/1999 | Beretta et al. | | 382/251 |
| 6,031,618 A | 2/2000 | Wang | | 356/419 |
| 6,069,973 A | 5/2000 | Lin et al. | | 382/167 |
| 6,101,602 A * | 8/2000 | Fridrich | | 713/176 |
| 6,141,120 A | 10/2000 | Falk | | 358/504 |
| 6,353,675 B1 | 3/2002 | Sharma | | 383/141 |
| 2002/0076103 A1 | 6/2002 | Lin et al. | | 382/173 |
| 2003/0072487 A1 | 4/2003 | Fan et al. | | 382/176 |

OTHER PUBLICATIONS

R. Barnett, "Digital Watermarking: Applications, Techniques and Challenges" [online], Aug. 1999, Electronics & Communications Engineering Journal, pp. 173-183, [Retrieved on Jun. 19, 2007]. Retrieved from the Internet:<URL: http://ieeexplore.ieee.org/iel5/2219/17262/00796062.pdf?tp=&isnumber=&arnumber=796062>.*

(Continued)

*Primary Examiner*—Matthew C. Bella
*Assistant Examiner*—G. F. Cunningham
(74) *Attorney, Agent, or Firm*—Jeannette M Walder

(57) ABSTRACT

A method for automatically classifying a printed image, includes scanning the printed image; selecting an n by n block of pixels from the scanned image; calculating an array of DCT coefficients of the pixel block, wherein the array of calculated DCT coefficients are representative of spatial frequency and spatial orientation of the pixel block; comparing the DCT coefficients with an array of predetermined values, wherein the array of predetermined values are indicative of different image marking processes used to produce printed images; and determining an image marking process used to create the printed image based on the comparison of the DCT coefficients with the array of predetermined values. The array of DCT coefficients may be sampled into a feature set and the feature set provided to a neural network to output the determined image marking process.

20 Claims, 6 Drawing Sheets
(3 of 6 Drawing Sheet(s) Filed in Color)

OTHER PUBLICATIONS

U.S. Appl. No. 10/604,200, filed Jun. 30, 2003, Reiner Eschbach, et al.

U.S. Appl. No. 10/604,201, filed Jun. 30, 2003, Gaurav Sharma, et al.

U.S. Appl. No. 10/861,310, filed Jun. 4, 2004, Ying-wei Lin, et al.

Gaurav Sharma, Shen-Ge Wang, Deepthi Sidavanahalli, Keith Knox, "The Impact of UCR on Scanner Calibration", Proc. IS&T's 1998 PICS Conference, pp. 121-124.

* cited by examiner

| 183 | 160 | 94  | 153 | 194 | 163 | 132 | 165 |
|-----|-----|-----|-----|-----|-----|-----|-----|
| 183 | 153 | 116 | 176 | 187 | 166 | 130 | 169 |
| 179 | 168 | 171 | 182 | 179 | 170 | 131 | 167 |
| 177 | 177 | 179 | 177 | 179 | 165 | 131 | 167 |
| 178 | 178 | 179 | 176 | 182 | 164 | 130 | 171 |
| 179 | 153 | 180 | 179 | 183 | 169 | 132 | 169 |
| 177 | 173 | 180 | 179 | 187 | 170 | 129 | 174 |
| 180 | 179 | 181 | 179 | 181 | 170 | 131 | 169 |

*FIG. 1*

| 313 | 56  | -27 | 18  | 78  | -60 | 27  | -27 |
|-----|-----|-----|-----|-----|-----|-----|-----|
| -38 | -27 | 13  | 44  | 32  | -1  | -24 | -10 |
| -20 | -17 | 10  | 33  | 21  | -6  | -16 | -9  |
| -10 | -8  | 9   | 17  | -10 | -13 | 7   | 1   |
| -6  | 1   | 6   | 4   | -3  | -7  | -5  | 5   |
| 2   | 3   | 0   | -3  | -7  | -4  | 0   | 3   |
| 4   | 4   | -1  | -2  | -9  | 0   | 4   | 4   |
| 3   | 1   | 0   | -4  | -2  | -1  | 3   | 1   |

METHOD AND SYSTEM FOR CLASSIFYING SCANNED-MEDIA

CROSS-REFERENCE TO RELATED APPLICATIONS

This application is related to co-pending, co-assigned U.S. application Ser. No. 09/737,515 to Lin et al. filed Dec. 15, 2000, for Method and Apparatus for Segmenting an Image Using a Combination of Image Segmentation Techniques ("D/A0647"); co-pending, co-assigned U.S. application Ser. No. 09/977,186 to Fan et al. filed Oct. 12, 2001, for Background-Based Image Segmentation ("D/A1159"); co-pending, co-assigned U.S. application Ser. No. 10/604,200 to Eschbach et al. filed Jun. 30, 2003, for Systems and Methods for Estimating an Image Marking Process Using Scanned Image Attributes and Color Calibration Profiles ("D/A1366"); and co-pending, co-assigned U.S. application Ser. No. 10/604,201 to Sharma et al., filed Jun. 30, 2003, for Systems and Methods for Associating Color Profiles With a Scanned Input Image Using Spatial Attributes ("D/A1366Q"), the contents of all of which are incorporated herein by reference and made a part hereof.

FIELD OF THE INVENTION

This invention relates generally to a method for automatically identifying a marking process used to form an image on a medium.

BACKGROUND OF THE INVENTION

A large number of color hardcopy images are being produced daily using a wide variety of image production processes such as conventional photography, lithography, xerography and inkjet printing. The images produced on these different media are often scanned subsequently, either for the purposes of copying or for creating an electronic representation for use in various applications. It is desirable that the scanning process accurately record the color information in the original hardcopy images. Since the spectral-response of typical scanners are not equivalent to those of a typical human observer, accurate color calibration can be obtained only if the correct medium dependent calibration is used for calibrating a color image. If the incorrect scanner color calibration is used, very significant color errors may be obtained. See for instance, "The Impact of UCR on Scanner Calibration, G. Sharma, S. Wang, D. Sidavanahalli, and K. Knox, Proc. IS&T's 1998 PICS conference, pp. 121-124.

In order to accurately calibrate a scanner, such as, for example, a color scanner, that scans an image carried on a substrate, different calibration transformations are required depending on the marking process, such as, for example, photography, inkjet printing, xerography, lithography and the like, and materials, such as, for example, toner, pigment, ink, etc., that are used to form the image on the substrate. For example, a calibration transformation that is used to calibrate the scanner for a photographic image is different from a calibration transformation that is used to calibrate the scanner for an ink jet-printed image, which is in turn different from a calibration transformation that is used to calibrate the scanner for a xerographically-formed image or for a lithographically-formed image. Additional accuracy may also be obtained in finer grain classification of the input image within each of these categories.

Typically, a user wishing to scan an image determines the marking process used to form the image from prior knowledge of the marking process, manually identifies the marking process such as, for example, photographic, ink jet, xerographic or lithographic, and uses the marking process information to set the scanner so that an appropriate calibration can be used. The manual identification is commonly done using different descriptions, such as Halftone vs. Photo vs. Xerographic Copy on the user interface from which different machine settings are inferred. Operator identification of the scanned medium can eliminate the problem of casts and color errors resulting from the use of an incorrect scanner calibration. However, this process is not only cumbersome but also correct identification of the input medium cannot be readily expected from novice users.

Previously, in D/A1366 an automatic method for identification of the medium without requiring additional information or operator input was proposed. The proposed method works by analyzing the spatial characteristics of the scanned image and utilizing the strong correlation between scanned media type and the spatial characteristics for the corresponding reproduction process. What is needed is an alternative approach for automatic media identification.

SUMMARY OF THE INVENTION

When scanning a color image on a hardcopy medium, it is important to apply the correct color correction associated with the appropriate media or to tag the image with the appropriate profile. A method of classifying a scanned printed media, according to the invention, uses the JPEG/DCT (Discrete Cosine Transform) for classifying the scanned media and matching the corresponding color calibration profiles created to the scanned documents. The method of the invention uses the fact that, in most scanning systems, a large amount of data will be described in the form of JPEG compressed data. A process identification in the JPEG domain (rather than the image domain) has clear advantages in a compressed image path. For this to be achieved the inventors have found a classifier that works well with JPEG supplied data, either through the Huffman codes and Encoding Cost Maps, or through the transform coefficients. (Encoding Cost Maps are described, for example, in U.S. Pat. No. 5,854,857 to Queiroz and Eschbach).

A method for automatically classifying a printed image, according to the invention, includes scanning the printed image; selecting an n by n block of pixels from the scanned image; calculating an array of DCT coefficients of the pixel block, wherein the calculated DCT coefficients are representative of spatial frequency and spatial orientation of the pixel block; inputting the array of DCT coefficients into a classifier which has been configured to identify different image marking processes used to produce printed images using DCT coefficients; and determining an image marking process used to create the printed image based on the array of DCT coefficients.

A method for automatically classifying a printed image, according to another aspect of the invention, includes scanning the printed image; selecting an n by n block of pixels from the scanned image; calculating an array of DCT coefficients of the pixel block, wherein the calculated DCT coefficients are representative of spatial frequency and spatial orientation of the pixel block; comparing the array of DCT coefficients with an array of predetermined values, wherein the array of predetermined values are indicative of different image marking processes used to produce printed images; and determining an image marking process used to create the printed image based on the comparison of the DCT coefficients with the array of predetermined values. Rather than using all the DCT coefficients, the method may further include sampling the array of DCT coefficients to produce a feature set of the pixel block; and comparing the feature set with the array of predetermined values to determine the image marking process used to create the printed image.

In accordance with another aspect of the invention, the method may further include grouping the array of DCT coefficients into a DC term, segments of DCT coefficients having similar radial spatial frequencies, and segments of DCT coefficients having similar spatial orientations; and for each segment, calculating a sum of absolute values of all DCT coefficient in the segment to produce a feature of the pixel block, wherein the feature set includes the DC term and all segments features. The feature set may then be input to a neural network, which has been trained with known examples of printed images. The method will determine if the image marking process is a photographic image marking process, a lithographic image marking process, a Xerographic image marking process or an inkjet image marking process. Once the image marking process is determined, a color calibration profile may be selected for the printed image based on the determined image marking process.

The method may be used with a single color channel, e.g., one of red, green and blue. Alternatively, the method may be used with all three color channels, and inputting the DCT coefficients for each color channel to a neural net. If the method is implemented in a system which already performs DCT compression of the image, all or part of those DCT calculations may be used in the method, and need not be separately calculated.

The array of predetermined values, where the array of predetermined values are indicative of different image marking processes used to produce printed images, may be determined by evaluation of known images or by heuristic design. The method is applied to a series of known images, the DCT coefficients collected and categorized as to value corresponding to the particular type of image marking process.

In accordance with another aspect of the invention, a system for automatically classifying a printed image, includes a scanner for scanning the printed image; a memory for storing the scanned image and for storing an array of predetermined values, wherein the array of predetermined values are indicative of different image marking processes used to produce printed images; and a processor for selecting an n by n block of pixels from the scanned image, for calculating an array of DCT coefficients of the pixel block, wherein the calculated DCT coefficients are representative of spatial frequency and spatial orientation of the pixel block, for comparing the array of DCT coefficients with the array of predetermined values, wherein the array of predetermined values are indicative of different image marking processes used to produce printed images, and for determining an image marking process used to create the printed image based on the comparison of the DCT coefficients with the array of predetermined values.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is an array of an exemplary 8 by 8 pixel array from an input image;

FIG. 2 is the DCT array corresponding to the input image of FIG. 1;

FIG. 3 illustrates sampling the DCT array of FIG. 2 according to spatial frequencies;

FIG. 4 illustrates sampling the DCT array of FIG. 2 according to spatial orientations;

DETAILED DESCRIPTION

Figure 5:
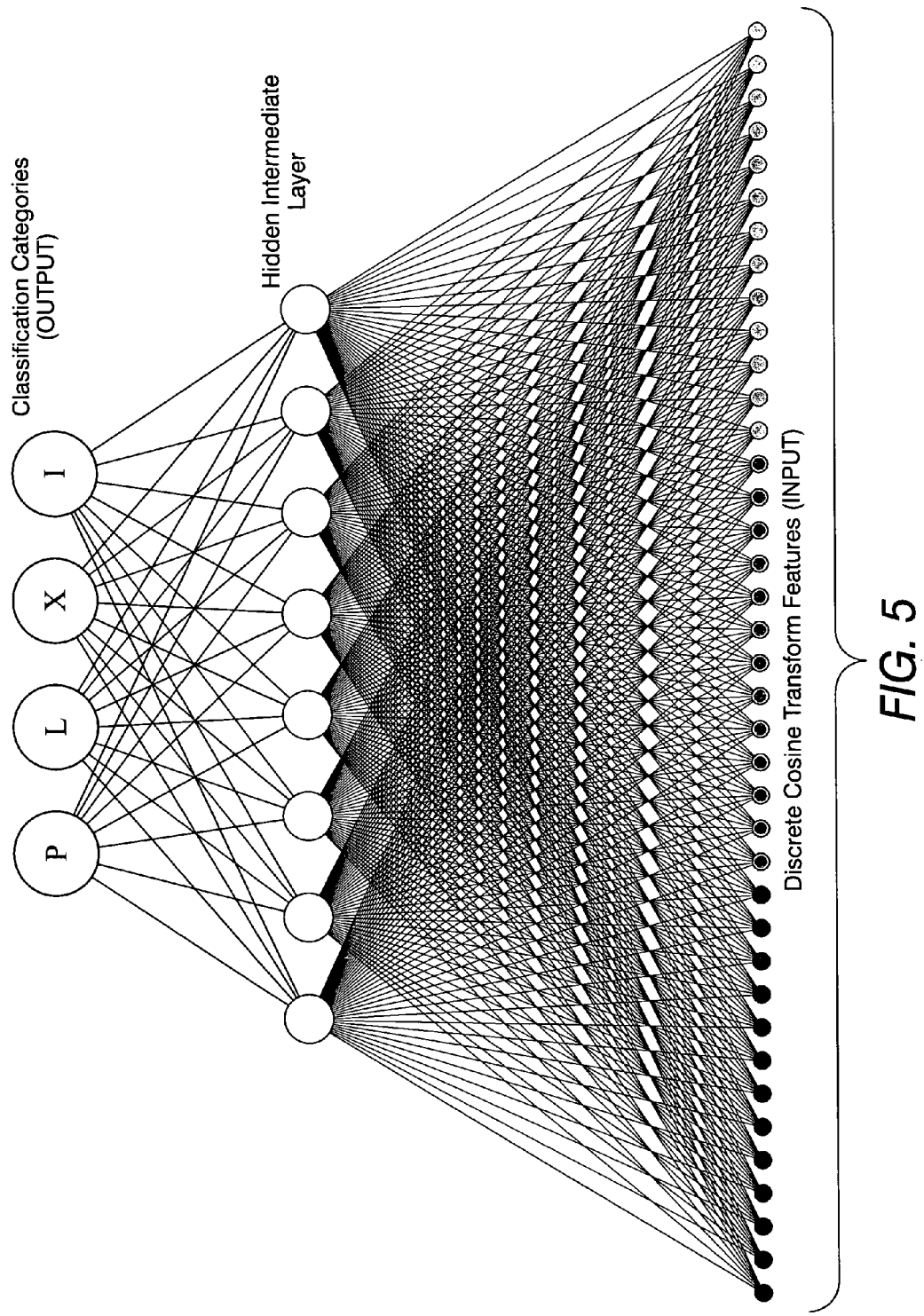
FIG. 5 illustrates a neural network in which feature sets from three color channels are input to determine a classification category.

A method for determining the printing technology used in producing a document analyzes the image through the Discrete Cosine Transform (DCT). (Details for the transform and its motivation may be found, for instance, in *Orthogonal Transforms for Digital Signal Processing*, by N. Ahmed and K. R. Rao). The following description is based on standard JPEG compressed data using 8 by 8 pixel blocks, but an extension to any base size (e.g., a pixel block of size n by n) or larger base sizes, e.g., 16 by 16 blocks is straightforward.

JPEG is the image compression standard developed by the Joint Photographic Experts Group. JPEG compression compresses gray scale images as well as color images. JPEG can compress the red-green-blue components of a color image as three separate gray scale images. The JPEG process divides an input image into 8 by 8 pixel blocks and then computes the discrete cosine transform (DCT) of each block (this results in a matrix of 64 coefficients). A quantizer is used to round off the DCT coefficients according to a quantization matrix. Finally, an encoder is used to output the quantized coefficients to an output file (the compressed image).

The discrete cosine transform (DCT) helps separate the image into parts (or frequency sub-bands) of differing importance with respect to the image's visual quality. The DCT is similar and closely related to the discrete Fourier transform; it transforms a signal or image from the spatial domain to the frequency domain. With an input image, f, the coefficients for the output "image" F, are calculated according to the following equation:

$$F(k_1, k_2) = C \sum_{n_1=0}^{7} \sum_{n_2=0}^{7} f(n_1, n_2) \cos\left[\frac{\pi(2n_1+1)k_1}{16}\right] \cos\left[\frac{\pi(2n_2+1)k_2}{16}\right].$$

The input image f is 8 pixels wide by 8 pixels high; $f(n_1, n_2)$ is the intensity of the pixel in row $n_1$ and column $n_2$. $F(k_1, k_2)$ is the DCT coefficient in row $k_1$ and column $k_2$ of the DCT array. All DCT multiplications are real. The DCT input is an 8 by 8 array of integers. This array contains each pixel's gray scale level. 8 bit pixels have levels from 0 to 255. The output array of DCT coefficients contains integers which can range from −1024 to 1023. For most images, much of the signal energy lies at low frequencies, which appear in the upper left corner of the DCT. As one moves to the right from the upper left corner, the corresponding coefficients represent increasing horizontally oriented frequencies, and as one moves lower from the upper-left corner the corresponding coefficients represent increasing vertically oriented frequencies. The lower right corner values represent highest frequency magnitudes.

A selected input image is scanned and an 8 by 8 pixel block from the scanned image selected for analysis. FIG. 1 is an exemplary 8 by 8 pixel block and FIG. 2 is the DCT array of normalized output corresponding to the DCT coefficients. Referring to FIG. 2, the first element (=313) of the 8 by 8 output block is the DC term and the other elements represent the cosine transforms with different spatial frequencies and different spatial orientations. The horizontal direction represents increasing frequency in the horizontal direction from left to right and the vertical direction represents increasing frequency in the vertical direction from top to bottom. The value of each cell represents the cosine transform of the corresponding frequency component in the input block.

Figures 3, 4:
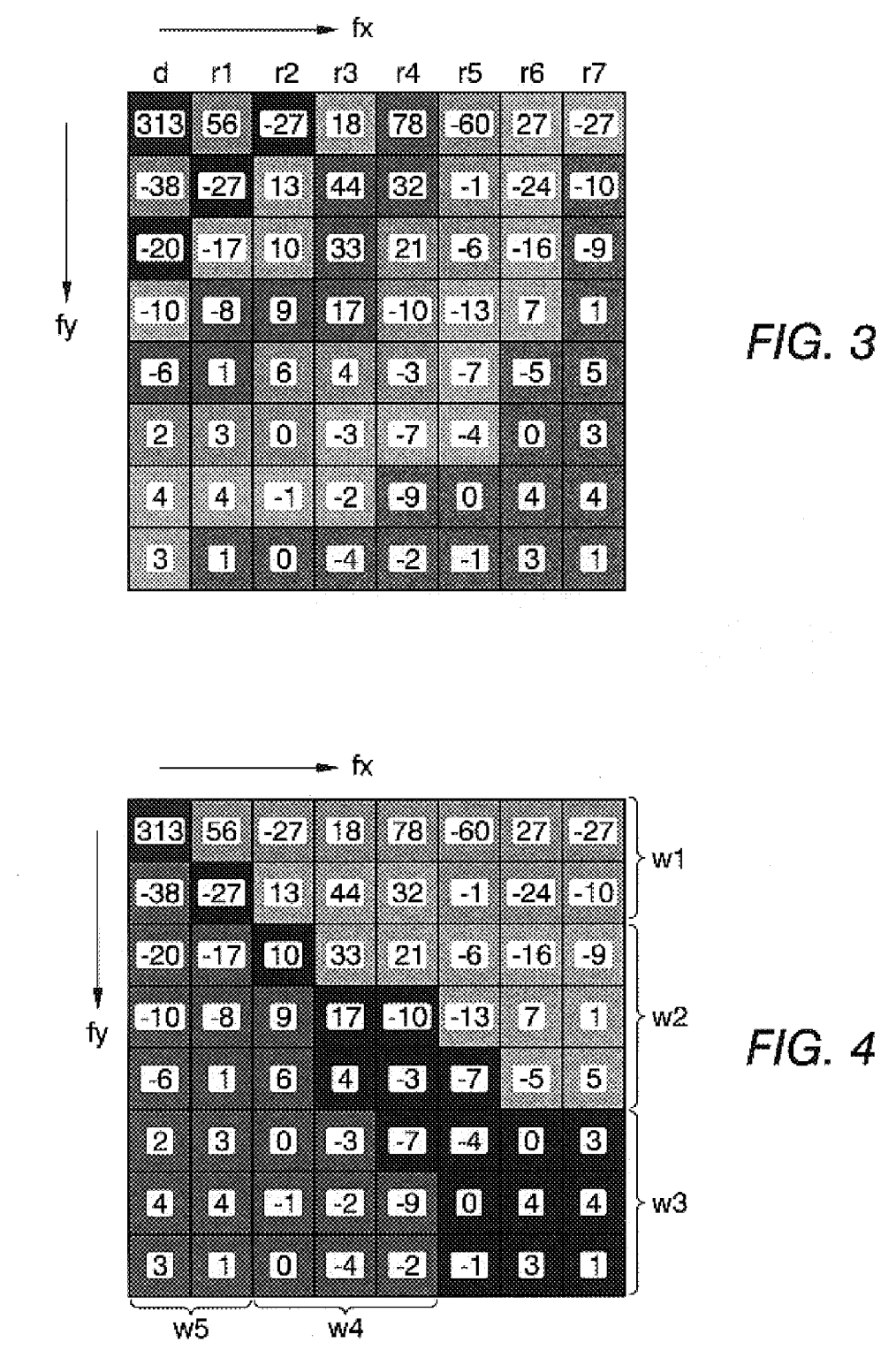

The method is based on the observation that the image printing method is well correlated with the print media (substrate and ink or toner). Thus, by identifying the microstructure of printed images, one can predict the print technology with high confidence. The difference in microstructure for the commonly used marking processes is particularly evident in the frequency domain and therefore the DCT is well suited for this analysis. Each of the DCT coefficients can be input into a classifier which has been trained or heuristically designed to identify printing method to determine if the input image is photographic, lithographic, Xerographic or inkjet. The array of DCT coefficients can be directly used in a classfier to estimate the marking process used to create the image. For example, the classifier can be configured to compare the array of DCT coefficients to an array of predetermined values corresponding to the different image marking processes to determine which image processing method was used to create the printed image. However, instead of providing these coefficients directly to a classifier, we propose further sampling of the DCT output to generate a smaller feature space for classification. The proposed sampling method is illustrated in FIGS. 3 and 4.

The array of 64 DCT coefficients are grouped or sampled into 13 segments, which are shown by different shadings in FIGS. 3 and 4. In addition to the single-element DC term, 7 ring-shaped segments, which group DCT coefficients with similar radial spatial frequencies together, are defined in FIG. 3, while 5 wedge-shaped segments, which group DCT coefficients with similar spatial orientations together, are defined in FIG. 4. For each segment, the sum of the absolute values of all coefficients in the segment is calculated and used as the output. The reduced feature set consists of 13 entries: dc, r1, r2, r3, r4, r5, r6, r7, w1, w2, w3, w4 and w5, with values, corresponding to the example shown in FIGS. 3 and 4, equal to 313, 94, 74, 68, 228, 129, 149, 60, 328, 205, 103, 62 and 91, respectively.

As discussed in D/A1366, different scanned media have distinguishable microstructures in nature. Contone photographic scanned images have much smoother appearance, microscopically, than halftone images, which are commonly generated by lithographic, xerographic and inkjet printing processes. Furthermore, most inkjet scanned images have an a-periodic dispersed nature, while the Xerographic and lithographic images have strong periodic structures with the lithographic reproduction corresponding to a higher spatial frequency and having lower noise than the xerographic image. These distinguishable natures of microstructures from different scanned media are well represented by the results of discrete cosine transformation of corresponding samples. The sampling method, described above, is especially suitable for extracting the distinguishable characteristics of different media, emphasizing differences between frequencies, as well as orientations of different microstructures. The reduced feature set is then analyzed and compared with an array of predetermined values to determine the image marking process used to create the printed image.

To facilitate the analysis and comparison process between the reduced feature set and the predetermined values indicative of the different image marking processes, a classifier based on a feed-forward neural-network may be used. In the case of gray scale images, a single channel and thus a single array of DCT coefficients may be calculated. In the case of color processes, an array of DCT coefficients may be calculated for each color channel (e.g., red, green and blue). Each array may be sampled to produce a reduced feature set. Referring to FIG. 5, a neural network is shown. For a color image, the input (DCT Features) to the neural network consists of 39 inputs (corresponding to 3 color channels each having a feature set of 13 elements), 8 hidden neurons (Hidden Intermediate Layer) and 4 outputs (Classification categories), where the 39 inputs are the sampled DCT outputs from red, green and blue channels together, and the 4 outputs represent the 4 image marking processes: photographic, lithographic, Xerographic and inkjet. The details of neural-network-based classifier are well known and can be found in many publications, e.g., "*Practical Neural Network Recipes in C++*", by Timothy Masters.

Figure 6:
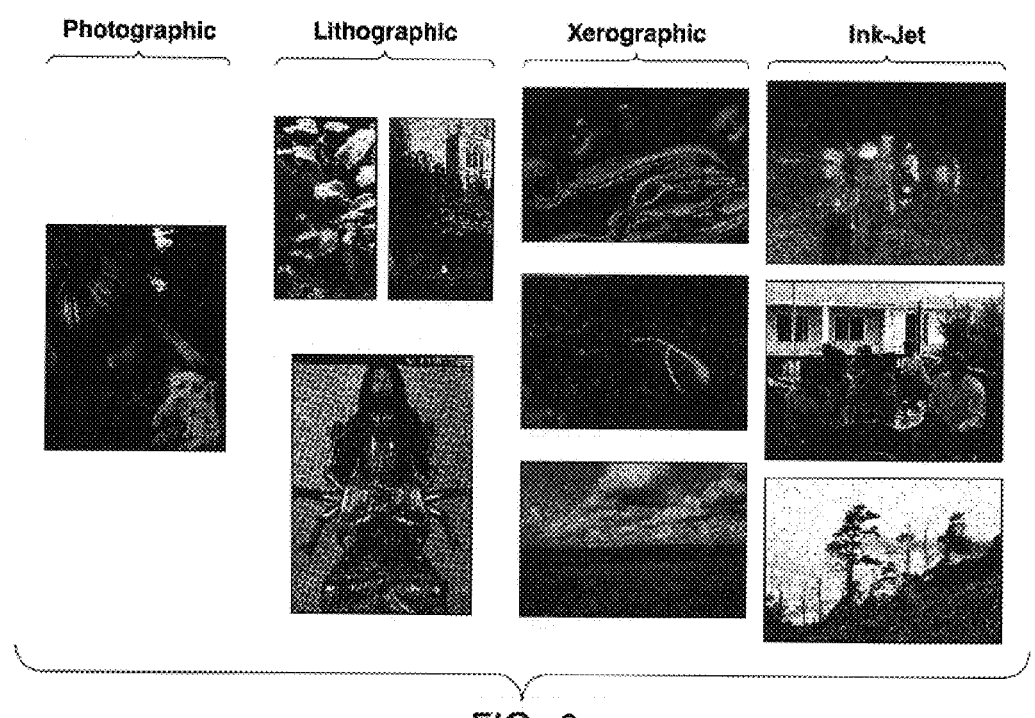
FIG. 6 are ten input images used to train a classifier.

Ten sample images, shown in FIG. 6, one photographic, three lithographic, three Xerographic and three inkjet images, were used evaluate the method. Two hundred 8 by 8 pixel blocks were chosen randomly from each image for training. An array of DCT coefficients was computed for each chosen block and each of the RGB channels, respectively. The resulting DCT arrays were further processed by the proposed ring/wedge-pattern sampling method. The sampled data combining with specified outputs (e.g., 1, 0, 0, 0 represents a photographic image) were used to train the neural-network classifier shown in FIG. 5.

Figure 7:
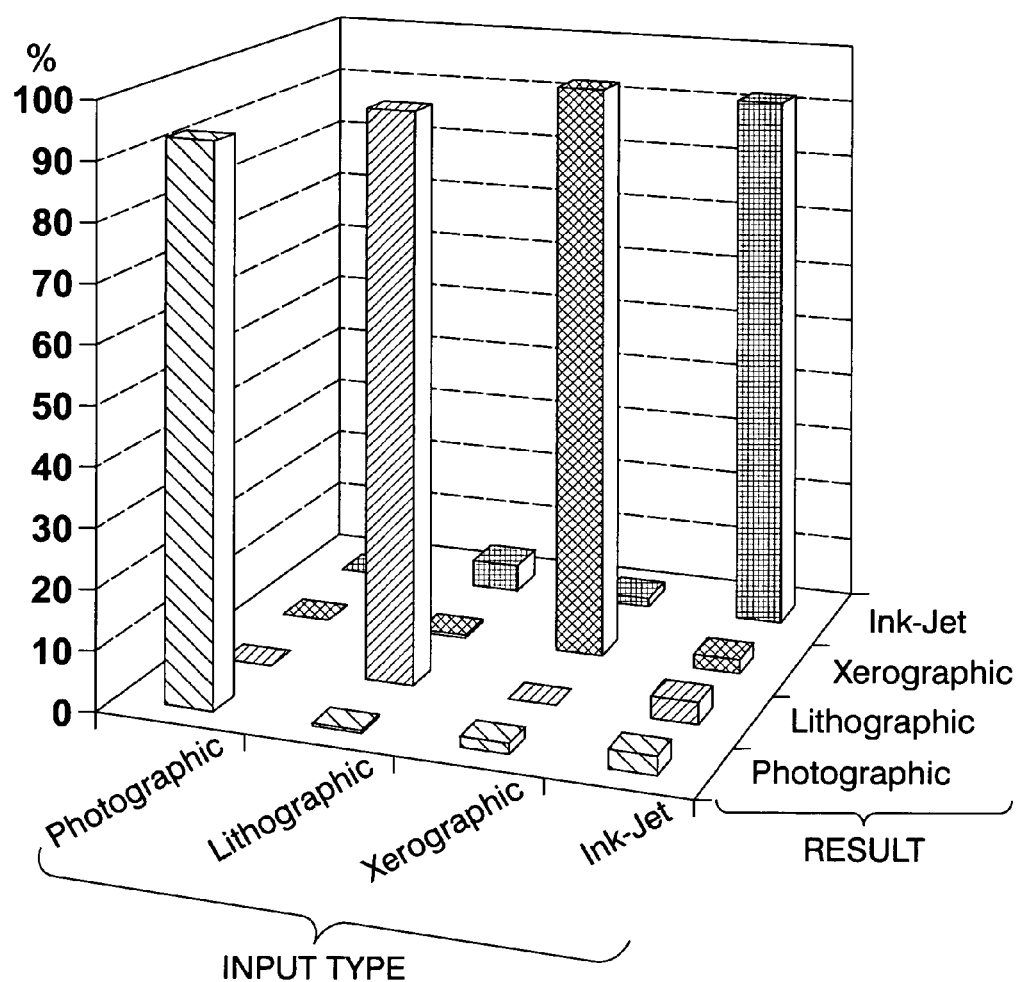
FIG. 7 illustrates the results of testing the trained classifier.

After proper training, the entire picture of each of the ten images was used for testing. In other words, every 8 by 8 pixel block was calculated for its DCT values and sampled as the inputs for the classifier. Note that fewer than 20% of the total 8 by 8 pixel blocks were excluded for both training and testing, if the average colors were too close to either paper white or solid black. All together, more than 3,000,000 8 by 8 pixel blocks were tested and the classification result is shown in FIG. 7. The statistics demonstrated in FIG. 7 is the classifier output based on the input from a single 8 by 8 pixel block. For real applications, the decision could be made by using more than one pixel block and, the correct-classification ratio would be even higher than 90%, shown here.

Combining the proposed sampling method of JPEG/DCT outputs and a neural-network classifier, one may build a system for classifying photographic, xerographic, lithographic and inkjet scanned media, and potentially other marking process types. By randomly selecting a single 8 by 8 pixel block from one of the test images and processing the 8 by 8 block through the system, the correct-classification is above 90%. Since DCT-based JPEG is widely used for image compression, which is an essential part for digital scanners, hardware or software implementations of DCT are already available in image paths for many scanners. The proposed approach may provide a very practical solution for automatic scanned-media identification. By using the DCT coefficients computed for compression or by reusing all or parts of this computation, the added computational load of the marking process classification may also be kept to a minimum.

Figure 8:
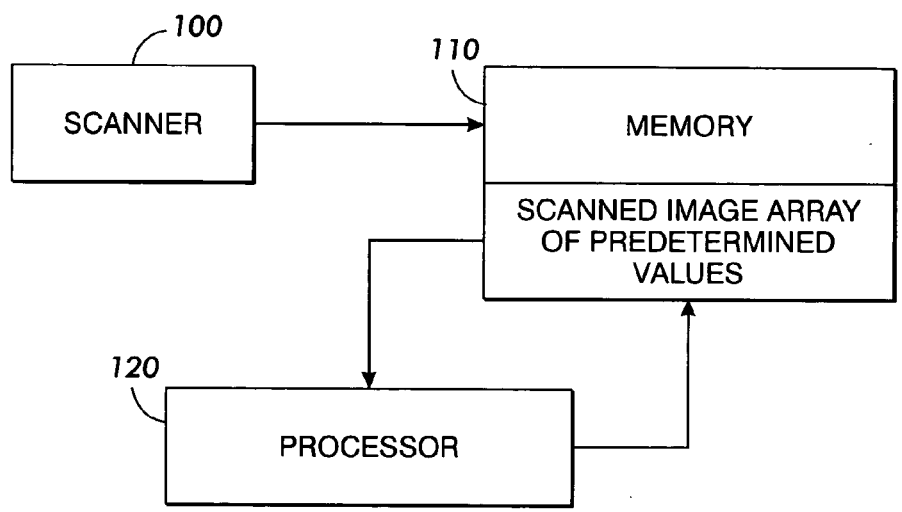
FIG. 8 is a block diagram of a system for classifying scanned media.

Referring to FIG. 8, a block diagram of a system for automatically classifying an image is shown. The system includes a scanner 100 for scanning the printed image. The scanned image is stored in memory 110. Also stored in memory 110 are the array of predetermined values indicative of the different image marking processes. A processor 120 selects an n by n block of pixels from the scanned image stored in memory 110, calculates an array of DCT coefficients of the pixel block, compares the array of DCT coefficients with the array of predetermined values, and based on the comparison, determines an image marking process used to create the printed image.

While this invention has been described with reference to a color scanner, the invention is not limited to such an embodiment. The invention may be applied to scanned image data captured at a remote location or to image data captured from a hard copy reproduction by a device other than a scanner, for example a digital camera. The invention may be practiced on any color reproduction device, such as, for example a color photocopier, and is also not intended to be limited to the particular colors described above. As noted above JPEG can compress the red-green-blue components of a color image as three separate gray scale images. Red-green-blue might be replaced by luminance-chrominance1-chrominance2, or cyan-magenta-yellow-black. JPEG compression can be accomplished for a variety of color spaces and the method and system of the invention works for all of them.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for automatically classifying a printed image, comprising:
    scanning the printed image;
    selecting an n by n block of pixels from the scanned image;
    calculating an array of DCT coefficients of the pixel block, wherein the calculated DCT coefficients are representative of spatial frequency and spatial orientation of the pixel block;
    inputting the array of DCT coefficients into a classifier which has been configured to identify different image marking processes used to produce printed images using DCT coefficients; and
    determining an image marking process used to create the printed image based on the array of DCT coefficients.

2. The method of claim 1, wherein inputting the array of DCT coefficients into a classifier comprises comparing the array of DCT coefficients with an array of predetermined values, wherein the array of predetermined values are indicative of different image marking processes used to produce printed images.

3. The method of claim 1, further comprising:
    sampling the array of DCT coefficients to produce a feature set of the pixel block; and
    inputting the feature set to the classifier to determine the image marking process used to create the printed image.

4. The method of claim 3, wherein the sampling step comprises:
    grouping the array of DCT coefficients into a DC term, segments of DCT coefficients having similar radial spatial frequencies, and segments of DCT coefficients having similar spatial orientations; and
    for each segment, calculating a sum of absolute values of all DCT coefficient in the segment to produce a feature of the pixel block, wherein the feature set includes the DC term and all segments features.

5. The method of claim 1, wherein the classifier comprises a neural network.

6. The method of claim 5, further comprising training the neural network with known examples of printed images.

7. The method of claim 1, wherein the determined image marking process comprises a photographic image marking process.

8. The method of claim 1, wherein the determined image marking process comprises a lithographic image marking process.

9. The method of claim 1, wherein the determined image marking process comprises a Xerographic image marking process.

10. The method of claim 1, wherein the determined image marking process comprises an inkjet image marking process.

11. The method of claim 3, wherein the n=8 and the feature set comprises the DC term, 7 spatial frequency terms and 5 spatial orientation terms.

12. The method of claim 1, further comprising selecting a color calibration profile for the printed image based on the determined image marking process.

13. The method of claim 1, further comprising:
    selecting an n by n block of pixels from the scanned image in each color channel;
    for each channel's pixel block:
        calculating DCT coefficients of the pixel block, wherein the calculated DCT coefficients are representative of spatial frequency and spatial orientation of the pixel block;
        grouping the array of DCT coefficients into a DC term, segments of DCT coefficients having similar radial spatial frequencies, and segments of DCT coefficients having similar spatial orientations; and
        for each segment, calculating a sum of absolute values of all DCT coefficient in the segment to produce a feature of the pixel block, wherein the feature set includes the DC term and all segments features; and
    inputting the feature sets from all color channels and the array of predetermined values to a neural network.

14. The method of claim 13, wherein n=8 and wherein the color channels comprise red, green and blue.

15. The method of claim 13, wherein n=8 and the color channels comprise luminance, chrominance1 and chrominance2.

16. A system for automatically classifying a printed image, comprising:

a scanner for scanning the printed image;

a memory for storing the scanned image and for storing an array of predetermined values, wherein the array of predetermined values are indicative of different image marking processes used to produce printed images; and a processor for selecting an n by n block of pixels from the scanned image, for calculating an array of DCT coefficients of the pixel block, wherein the calculated DCT coefficients are representative of spatial frequency and spatial orientation of the pixel block, for comparing the array of DCT coefficients with the array of predetermined values, wherein the array of predetermined values are indicative of different image marking processes used to produce printed images, and for determining an image marking process used to create the printed image based on the comparison of the DCT coefficients with the array of predetermined values.

17. The system of claim 16, wherein the processor, for sampling the array of DCT coefficients to produce a feature set of the pixel block; and for comparing the feature set with the array of predetermined values to determine the image marking process used to create the printed image.

18. The system of claim 17, wherein the sampling comprises:

grouping the array of DCT coefficients into a DC term, segments of DCT coefficients having similar radial spatial frequencies, and segments of DCT coefficients having similar spatial orientations; and for each segment, calculating a sum of absolute values of all DCT coefficient in the segment to produce a feature of the pixel block, wherein the feature set includes the DC term and all segments features.

19. The system of claim 18, wherein processor includes a neural network, responsive to the feature set and the array of predetermined values for determining an image marking process used to create the printed image.

20. The system of claim 19, wherein the neural network has been trained with known examples of printed images.

* * * * *